United States Patent [19]

Werling

[11] Patent Number: 4,549,660
[45] Date of Patent: Oct. 29, 1985

[54] DRUM FOR SEPARATION OF A BULK MATERIAL

[75] Inventor: Kenneth H. Werling, Växjö, Sweden

[73] Assignee: Scandinavian Farming Aktiebolag, Hoganas, Sweden

[21] Appl. No.: 456,045

[22] PCT Filed: May 7, 1982

[86] PCT No.: PCT/SE82/00159

§ 371 Date: Dec. 27, 1982

§ 102(e) Date: Dec. 27, 1982

[87] PCT Pub. No.: WO82/03963

PCT Pub. Date: Nov. 25, 1982

[30] Foreign Application Priority Data

May 15, 1981 [SE] Sweden ................. 8103060

[51] Int. Cl.$^4$ ............................................. B07C 3/04
[52] U.S. Cl. ................................. 209/44.3; 209/690; 209/473
[58] Field of Search .............. 209/44.3, 18–21, 209/44.2, 635, 152, 473, 482, 645, 646, 689, 690, 451, 452, 644, 639

[56] References Cited

U.S. PATENT DOCUMENTS

| | | | |
|---|---|---|---|
| 2,577,488 | 12/1951 | Stephenson | 209/152 |
| 4,018,567 | 4/1977 | La Point | 209/451 X |
| 4,187,172 | 2/1980 | Datsenko et al. | 209/44.3 |
| 4,207,177 | 6/1980 | Block | 209/44.2 |
| 4,252,642 | 2/1981 | Mohri | 209/452 |

Primary Examiner—David A. Scherbel
Assistant Examiner—Glenn B. Foster
Attorney, Agent, or Firm—Murray, Whisenhunt and Ferguson

[57] ABSTRACT

A drum for separation of a bulk material into a heavier and a lighter fraction is arranged to be rotated around its central axis at a certain velocity and to be traversed by a flow of air at a certain flow velocity. The drum has at least one discharge aperture for the heavier fraction and at least one discharge aperture for the lighter fraction further on in the drum in the direction of the air flow. In at least one portion of the drum (2) between the said discharge aperture for the heavier fraction and the said discharge aperture for the lighter fraction the drum is provided with rearward-feeding transport members in the form of inwardly-directed spirals (27) fastened to the inside of the drum and arranged so that during rotation of the drum material is transported in the thread turns (28) between the spirals to the rear towards the said discharge aperture for the heavier fraction, also lifters (29, 30) for the bulk material arranged in the thread turns (27) and designed as barriers to prevent continued rearward feed of the bulk material in the thread turns concerned. The lifters are arranged in groups along the portion involved of the drum around the inside of the drum, and the groups can contain the same or different numbers of lifters and be arranged having the same or different pitch between the groups, but the distance (L) between the groups is such and the number of thread turns provided with lifters in each group is such that during each revolution of the drum on the whole more material of the heavier fraction is fed to the rear through each group via the free thread turns than is raised up by the lifters in the thread turns in the next following group, viewed in the direction of air flow, which is blocked off by lifters and at the air velocity which is matched to suit drum diameter is blown some distance to the rear by the air flow when it drops down from the lifter as the drum rotates, whilst the lighter fraction is blown further forward so that the forward feed of this fraction is much greater than the rearward feed in the thread turns.

9 Claims, 3 Drawing Figures

DRUM FOR SEPARATION OF A BULK MATERIAL

TECHNICAL FIELD

The invention relates to a drum having at least one section for separating a bulk material into a heavier and a lighter fraction. More particularly the invention relates to a drum which is designed to be rotated around its horizontal or possibly slightly inclined central axis at a certain speed and to be traversed by a flow of air having a certain flow velocity, besides which the drum has at least one discharge aperture for the heavier fraction and at least one discharge aperture for the lighter fraction located further on in the drum viewed in the direction of air flow. In particular the invention relates to a drum having a section for separation of chopped harvested crops which contain a mixture of grains and lighter components, so that it is possible to obtain the grains separately and straw and other lighter components separately.

BACKGROUND

In Swedish patent application Nos. 8000682-8, 8003989-4 and 8003990-2, filed by the same applicant, a description is given of equipment appertaining to the technical field described above. By means of these proposed inventions, equipment has been created for drying, threshing and separating a harvested crop which contains components of different types, in such a way that none of the components suffers damage, but instead can be kept for use in the most suitable manner. A very high degree of separation of the grain from the chopped harvest crop lighter components has also been achieved, which is a pre-requisite for good overall economics on the part of the plant.

DESCRIPTION OF THE INVENTION

The aim of the invention is to offer a modified, improved separation drum. In particular one aim is to design the separation drum in such a way that the degree of separation and the capacity of the drum can be calculated mathematically and be predicted even on the drawing board, which is of decisive importance for optimising the dimensions of the installation and the design of detailed components, all with the aim of reducing plant costs and of being able to increase capacity whilst retaining good or improved separation of the more valuable heavier fraction.

These and other objectives can be achieved when the drum, in at least a portion of the same, between the said discharge aperture for the heavier fraction and the said discharge aperture for the lighter fraction, is provided on the one hand with rearward-feeding transport devices in the form of inwardly-directed spirals fastened to the inside of the drum and arranged during rotation of the drum to transport material in the thread turns between the spirals to the rear towards the said discharge aperture for the heavier fraction, also lifters for the bulk material arranged in all thread turns and designed as barriers to prevent continued rearward feed of the bulk material, the said lifters being arranged in groups along the said portion around the inside of the drum, a number of the thread turns, but not all, in each such group containing lifters, the lifters being arranged to have the same or different pitch, but that the pitch or distance between the groups is such and the number of thread turns provided with lifters in at least the majority of the groups is such that during each revolution performed by the drum, in total more material of the heavier fraction is fed rearwards through the free thread turns in these groups than is lifted up by the lifters in the thread turns in the next following group, viewed in the direction of air flow, which are blocked off by lifters and at the air velocity which is matched to suit the drum diameter is blown some distance forward by the air flow when it drops down from the lifter during rotation of the drum, whilst the lighter fraction is blown further on so that the forward feed of this fraction is considerably greater than the rearward feed in the thread turns. The lifters are placed preferably in at the most alternate thread turns in the said groups.

Further characteristics of the invention will be indicated by the patent claims and by the following description of a preferred embodiment.

BRIEF DESCRIPTION OF DRAWINGS

In the following description of a preferred embodiment reference will be made to the appended diagrams in which.

BEST MODE OF CARRYING OUT THE INVENTION

Figure 1:
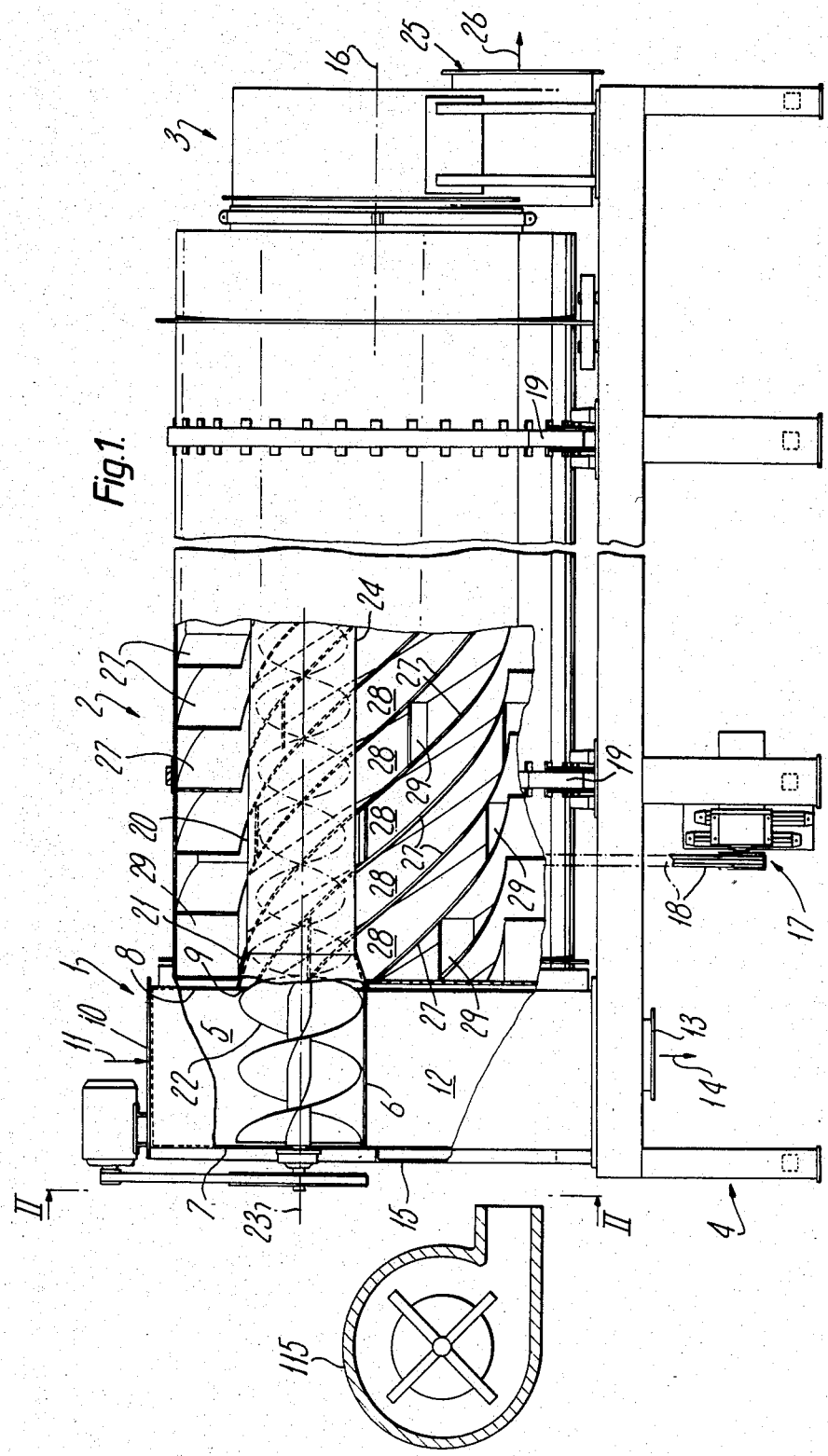
FIG. 1 gives a side view of a separation plant with a separation drum in accordance with the invention, where the drum and a feed chamber have been shown partly in section so as to illustrate the interior of the drum and the feed device.

The installation shown in FIG. 1 consists as regards its main components of a chamber 1 which accommodates members for feeding in the bulk material which is to be separated and for discharging the heavier fraction of the bulk material, a separation drum 2 and a discharge chamber 3 for the lighter fraction of the bulk material. A foundation is designated as 4.

The upper portion of chamber 1 is provided with a trough 5 with a semi-cylindrical bottom 6 a rear end 7 and a forward end 8 which is provided with a circular aperture 9. A feed aperture for the bulk material is designated as 10. The feed of the bulk material is symbolised by the arrow 11. Underneath the trough 6 there is a chamber 12 for the separated heavier fraction of the bulk material. A discharge aperture for the heavier fraction is designated as 13, and the discharge of the heavier fraction is symbolised by the arrow 14. In the vicinity of chamber 12 there is an air intake 15 provided with a mesh which allows a flow of air from a fan or blower 115 to be passed through the drum 2.

The separation drum 2 is arranged to be rotated around its central axis 16 by means of a drive motor 17 via a V-belt transmission 18. The drum 2 rolls on a number of bogies 19 on the foundation 4. At its end which faces the drum 1 the drum 2 communicates with the aperture 9 in the trough 5. Thus from trough 5 a tube 20 leads into the interior of the drum 2 at a level above the centre line 16. A conical transition between the aperture 9 and tube 20 is designated as 21. Through the trough 5 and tube 20 a feeder screw 22 extends which has a somewhat larger diameter in the area of the trough 5 than in tube 20. The central axis 23 of feeder screw 22 is parallel with the central axis 16 of the drum. In accordance with the embodiment, the tube 20 extends a distance into the drum 2 which is somewhat more than one third of the total length of drum 2. One end of tube 20 is designated as 24.

At its far end the drum 2 is provided with a discharge aperture, not shown, for the lighter fraction. The discharge chamber 3 is connected to this farther discharge aperture. From the discharge chamber 3 the lighter fraction is arranged to be fed further through a discharge aperture 25. The discharge direction of the lighter fraction is symbolised by the arrow 26. The discharge chamber 3 does not comprise any part of the invention and hence this has not been illustrated in greater detail.

The cylindrical separation drum 2 is clad internally with spirals 27 consisting of strips of plate, twisted in spiral fashion and directed radially inwards, which are welded onto the inside of drum 2. The thread turns between the spirals 27 have been designated as 28. The spirals 27 and thus also the thread turns 28 extend along the entire separation drum 2, i.e. from its left wall against chamber 1 to the discharge aperture, not shown, at the farther end of the drum against the discharge chamber 3.

Figure 3:
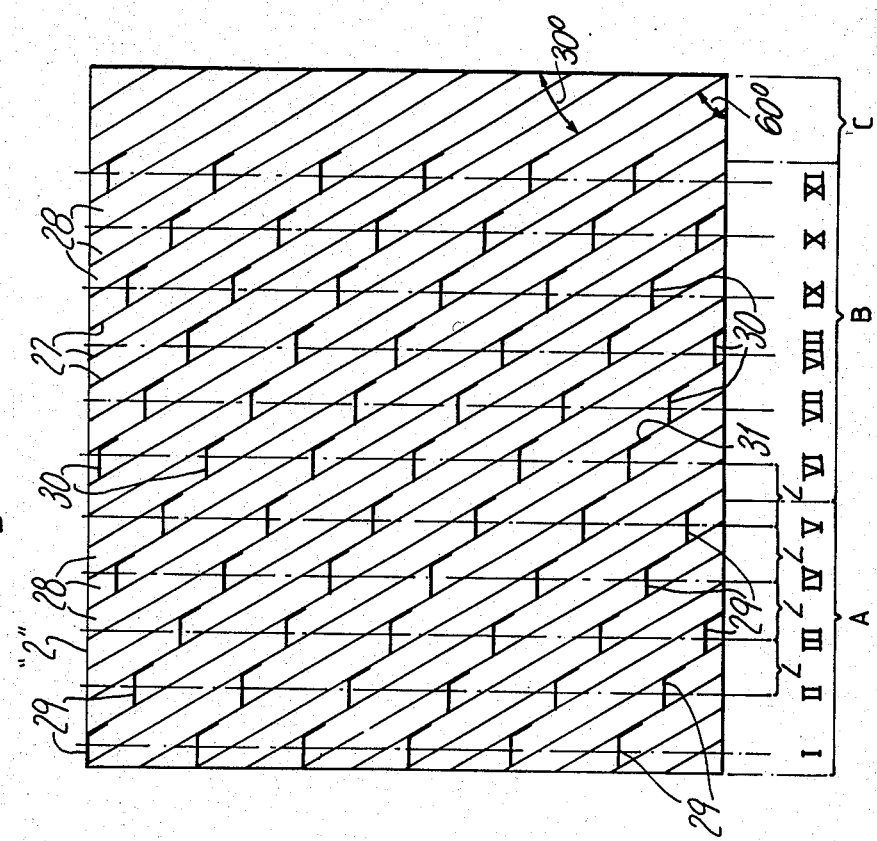
FIG. 3 is a plan projection of the inside of the drum.
Figure 2:
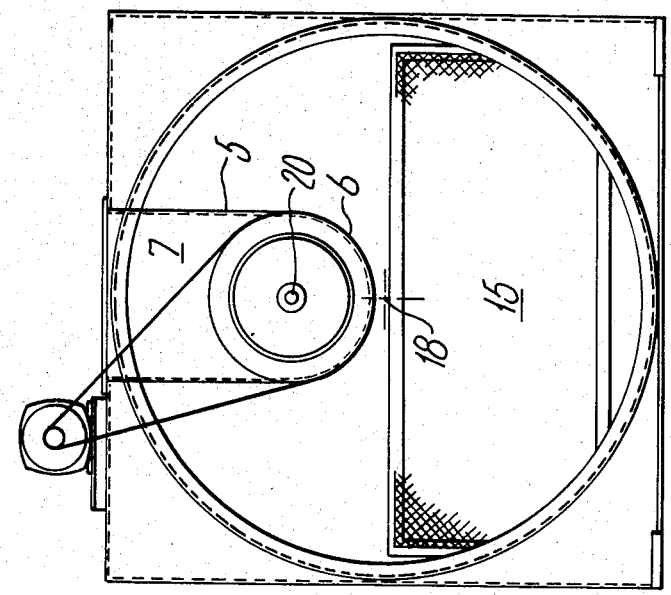
FIG. 2 is an end view II—II in FIG. 1.

The plan projection of the inside of the drum shown in FIG. 3 indicates that lifters 29 and 30 are located along a major portion of the length of the drum 2 in the thread turns 28 between adjacent spirals 27. The lifters 29 in a first section A have the shape of straight bars which have the same height as the spirals 13. Section A extends from the left wall of drum 2 close to chamber 1 up to the inner end 24 of the feed tube 20. It is indicated by FIG. 1 that the spirals 27 and bars 29 in zone A have a height which is only slightly less than the vertical distance between the top side of tube 20 and the inside of drum 2. In the next section B which is somewhat longer than section A the lifters 30 are longer than the height of the spirals 27, a point which is not indicated by the diagrams. This gives a more efficient feed of the light fraction, and furthermore they are provided with legs 31 in the vicinity of the spiral which, relative to the lifters 30, is located in the lee direction. The remainder of the separation drum 2 nearest the discharge aperture up to the discharge chamber 3 is designated as C. This section of the separation drum 2 has no lifters and is designated as the grain trap.

As shown in FIG. 3, the lifters 29 and 30 are distributed around the periphery of drum 2 in rows I, II, III... XI with equal spacing between the rows and with an equal number of lifters 29 or 30 in each row. In accordance with the embodiment section A contains five rows I–V and section B has six rows VI–XI with an identical number of lifters (six) in each row. In accordance with the embodiment the lifters 29 or 30 are arranged in alternate thread turns 28 in each row I, II, III etc., but it is also feasible to locate the lifters in each third, each fourth, in two thread turns out of five etc. in each row of lifters I, II, III etc.

The distance L between rows I, II, III etc. is established so that $L_1 > a \cdot L < L_{t}$, where $L_{1,t}$ can be established using the following expression for the trajectory of a particle in the horizontal plane:

$$L_{1,t} = v_L t - \frac{v_s^2}{g} \ln\left(\frac{v_L g}{v_s^2} + 1\right)$$

where
$v_L$ = air velocity in m/s $t$ = time of fall in seconds
$g$ = gravitational acceleration 9.81 m/s²
$v_s$ = the suspension velocity of the particle concerned, i.e. the lighter or the heavier particle, at a certain given particle size on the part of the heavier or the lighter fraction respectively which is the velocity where the air resistance in this ideal case is balanced precisely by the particle gravitational force.
$a = 1$, where alternate thread turns in the groups are blocked by lifters, $= \frac{2}{3}$ when each third thread turn is blocked, $= \frac{1}{2}$ when each fourth thread turn is blocked, and so on for each fifth, for two thread turns out of five etc.

The time of fall t is calculated from the expression:

$$t = \frac{v_s}{g} \cosh^{-1}(\exp(L_y g / v_s^2))$$

where
$L_y$ = the vertical trajectory in meters of the selected particle.

The trajectory in the vertical plane, $L_y$ is governed by the shape of the lifters, speed of rotation etc., but is normally 85% of the diameter. The suspension velocity $v_s$ of the particle changes with air humidity, air temperature and particle moisture content. With several particles there is a scatter around a horizontal average trajectory. With an increased volume of grain and straw, the scatter increases, whilst at the same time the average values for the trajectories of the grain and straw respectively in the horizontal plane approximate to each other. The expression for the distance between the rows $L_1 > a \cdot L < L_t$ refers, as mentioned, to the horizontal average trajectory of a straw particle having a certain selected size and respectively for a normal grain or corresponding heavier fraction in the harvested crop. The angle of slope of the spirals 27 in the axial plane towards the drum is between 40° and 80°, preferably between 45° and 75°. The slope, i.e. the pitch of the threads, can also vary along the length of the drum, and this can for example be utilised to optimise the function of the drum in various respects.

Example: Harvested crops in the form of grains mixed with chopped straw, husks and similar lighter particles are fed into the trough 5 through the aperture 10. From the trough 5 the mixed crop is passed by means of the screw 22 through tube 20 into the centre of drum 2. As a result of rotation of drum 2 the grains and straw are transported rearwards in thread turns 28. When some of the rows I–XI in FIG. 3 are reached the fairly mixed bulk material passes by the lifters 29 or 30 in the thread turns which are vacant in the row of lifters concerned, i.e. there is no bulk material there. In accordance with the embodiment this signifies that the bulk material passes without hindrance in each row of lifters. In the remaining thread turns however, in the region of each row of lifters, the bulk material is blocked by the lifters 29 or 30 and is lifted up by these as drum 2 rotates. The lifters 29 and 30 empty their contents at a height which corresponds to about 85% of the free diameter of the drum 2 (somewhat less for the shorter lifters 29 and somewhat more for the longer lifters 30). The expression "free diameter" signifies the diameter inside the spirals 27. The material which falls downwards from the lifters 29, 30 towards the base of drum 2 is transported by the air flow in the direction of the air flow, i.e. to the right in FIGS. 1 and 3, so that the grain and straw, or the corresponding heavier and lighter fractions respectively, end up at different distances from the row of lifters from which the assumed material has been discharged from its holder in accordance with the equations mentioned above. As $L_l(straw) > a \cdot L > L_t(grain)$, the majority of the grains, e.g. 60% will land in front of the next row. By way of example this can be row VII. Statistically, half of this will be fed backwards behind row VI from which the material has been emptied from its container into the free thread turns in the row involved VI. Almost all the remainder, 40%, of the material raised by the lifters in row VI will land between row VII and VIII. Half of this will be fed rearwards in the free thread turns past the lifters in row VIII, whilst the other half will be raised by the lifters in this row VIII and taken by the air flow some distance forwards. Half of the material raised up will thus be raised again in the same row of lifters. On the whole the rearwards feed of the grains will be about 1.5 times greater than the forward feed. In the case of straw which is transported further by the air flow, in each occasion when it drops the forward feed towards the discharge aperture up to the discharge chamber 3 will normally be several times greater than the rearward feed, which gives more effective separation whilst at the same time increasing drum capacity.

In the last section C the grain trap, there are no lifters. The distance between the last row of lifters XI and the discharge aperture for the light fraction at the farther end of the drum is established in such a way that the majority of the straw is discharged directly through the discharge aperture at this end. The material which lands in the grain trap, mainly some straw and other lighter particles but also some grain, is fed backwards and is subjected to renewed separation, which finally results in the straw again being fed towards the discharge aperture for the lighter fractin close to the discharge chamber 3, and the grains towards the chamber 12 in chamber 1. This means that only a small portion of the grains end up in the grain trap C and that the majority of the grains are fed back extremely rapidly towards chamber 12 for further transport away through aperture 13.

The sub-divisioning of the lifters 29, 30 into clearly distinct rows I, II, III . . . IX facilitates the dimensioning of the drum 2. This should preferably be dimensioned for a certain type of crop, but to some extent it is possible to adjust the separation of other types of grain by means of the air flow.

It should be evident that within the framework of the following patent claims the invention can deviate from the description provided here. Thus it is possible to envisage that the lifters do not necessarily have to be arranged in rows in the same plane, but instead in groups where the lifters can be placed on either side of an assumed plane. In this context it should be evident that the lifters in one group can continue directly into a next group in the form of continuous rails through the portion of the drum concerned, or even in such a way that the lifters overlap each other, all presupposing that $L_l > a \cdot L > L_t$ with the definitions provided above. Furthermore it is feasible that the lifters are not so designed that they totally block the thread turns, but merely a portion of the thread turns, or that they are provided with apertures or gaps permitting some of the crop to pass by in the thread turns.

I claim:

1. A drum separator for separating a bulk particulate material having a heavy fraction and a light fraction into a heavy fraction and a light fraction, said drum separator comprising:

a hollow, substantially cylindrical drum having a horizontally extending central axis and a front and a rear, said drum rotatable about said central axis;

means for introducing a bulk particulate material into said drum;

first discharge means, located at the rear of the drum, for discharging a heavy fraction from said drum;

second discharge means, located at the front of the drum, for discharging a light fraction from said drum;

means for passing an air flow through said drum from rear to front in a direction substantially parallel to said central axis;

in at least one horizontally extending section of said drum, between said first discharge means and said second discharge means, a plurality of rearward-feeding transport members in the form of inwardly directed spirals fastened to the inside of said drum, said inwardly directed spirals defining a plurality of thread turns located between adjacent spirals, said thread turns, upon rotation of the drum, transporting material in the thread turns toward the first discharge means;

lifter means for preventing continued rearwardfeeding of all of said material in said thread turns and for raising said material in said thread turns and dropping it across said air flow upon rotation of said drum, said lifter means comprising a plurality of groups, each said group lying in a row which is oriented in an imaginary plane substantially transverse to said central axis, each of said imaginary rows intersecting at least a portion of said plurality of thread turns, at least one of said intersected thread turns containing a lifter in said row and at least one of said intersected thread turns not containing a lifter in said row, each of said groups axially spaced apart from adjacent groups, the number of thread turns containing lifters in at least the majority of said plurality of groups being such that during each rotation of the drum about said central axis at a predetermined rotational velocity, while the air flow passes through the drum at a predetermined velocity, the material raised up by said lifters and dropped down across said air flow is blown forward by said air flow, more material of the heavy fraction is generally fed to the rear through the action of the thread turns than is generally fed forward by said air flow acting on the material lifted by the lifters and forward feed of said light fraction by said air flow is generally greater than rearward feed of said light fraction in said plurality of thread turns.

2. A drum separator as claimed in claim 1, wherein at least one lifter is located in each of said plurality of thread turns.

3. A drum separator as claimed in claim 1, wherein each said imaginary disc intersects only a portion of said plurality of thread turns.

4. A drum separator as claimed in claim 1, wherein said groups are equally spaced apart in the horizontal direction.

5. A drum separator as claimed in claim 1, wherein each said group contains the same number of lifters.

6. A drum separator as claimed in claim 1, wherein the horizontal spacing between adjacent imaginary discs is given by the equation $$L_l > aL > L_t$$

where

L=horizontal spacing between the centers of adjacent imaginary discs;

$L_l$=the horizontal average transport distance of the particles of the light fraction during the fall of these particles from the lifters across the air flow;

$L_t$=the horizontal average transport distance of the particles of the heavy fraction during the fall of these particles from the lifters across the air flow; and a=1 when alternate thread turns are blocked by lifters in said groups, ⅔ when each third thread turn is blocked, ½ when each fourth turn is blocked and so on.

7. A drum separator as claimed in claim 1, wherein a lifter is located in not more than each second thread turn in each said group.

8. A drum separator as claimed in claim 1, wherein said spirals form an angle of 40°–80° toward the axial plane of the drum.

9. A drum separator as claimed in claim 1, wherein said spirals form an angle of 45°–75° toward the axial plane of the drum.

* * * * *